Aug. 14, 1923.
R. HEDDLE ET AL
ANIMAL TRAP
Filed March 24, 1923
1,464,872
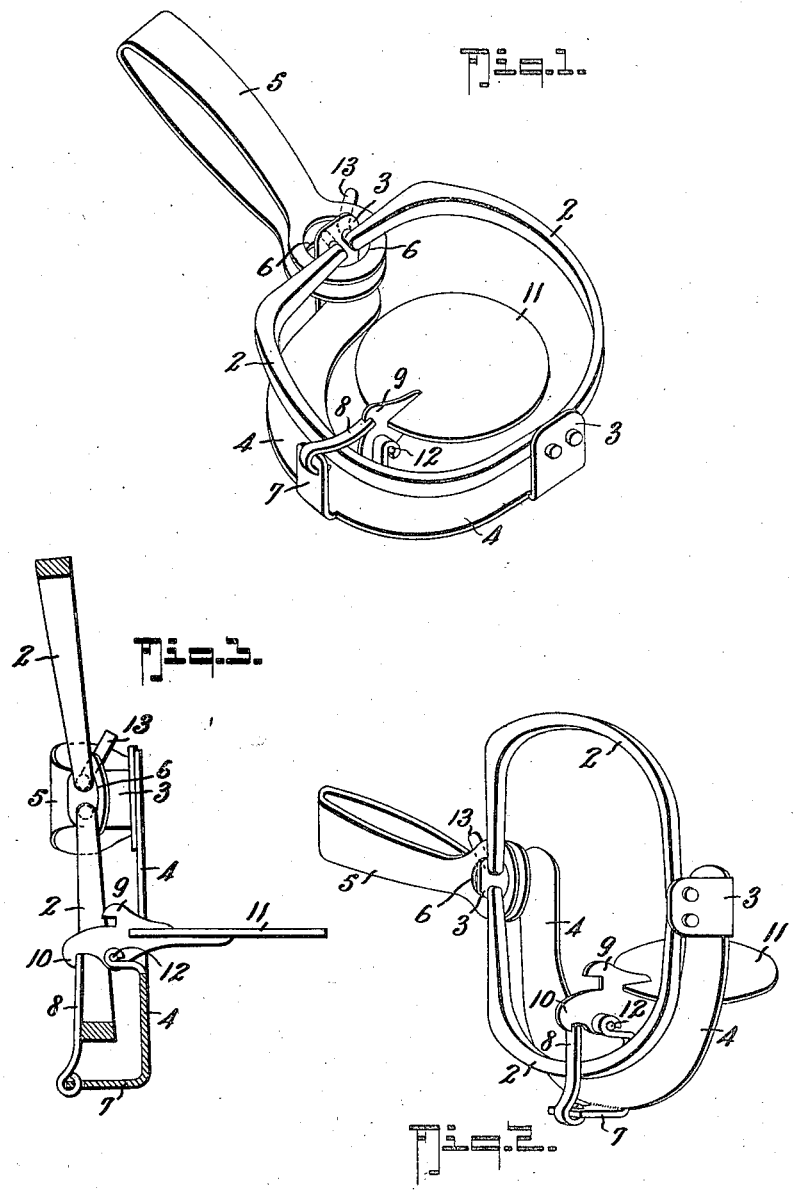
INVENTOR
Robert Heddle.
Robert Qua.
BY
Albert E. Dietrich
ATTORNEY Patented Aug. 14, 1923.

1,464,872

UNITED STATES PATENT OFFICE.

ROBERT HEDDLE AND ROBERT QUA, OF NELSON, BRITISH COLUMBIA, CANADA.

ANIMAL TRAP.

Application filed March 24, 1923. Serial No. 627,432.

*To all whom it may concern:*

Be it known that we, ROBERT HEDDLE and ROBERT QUA, citizens of the Dominion of Canada, residing at Nelson, in the Province of British Columbia, Canada, have invented certain new and useful Improvements in Animal Traps, of which the following is a specification.

This invention relates to a spring jaw animal trap of that class wherein the jaws are drawn sharply together by the action of the spring on the ends of the jaw members adjacent their pivotal connection to the base.

In the ordinary jaw trap of this class the jaw members are pivoted in the upwardly turned ends of a base member extending flatly across between the ends of the jaw members. This base member not only interferes to some extent with the free movement of the bait pan, but prevents the trap being used in other than a horizontal position.

In the trap, which is the subject of this application, the base member, in the upwardly turned ends of which the ends of the jaws are mounted, is of horseshoe shape, so as to leave the central space clear. It also enables the sear of the bait pan to be provided with two detents, one to support the bait pan when the trap is in a horizontal position, and the other to support it in a position at right angles thereto.

The invention is fully described in the following specification, reference being made to the drawings by which it is accompanied, in which:

Fig. 1 is a perspective view showing it as applied in the horizontal position.

Fig. 2, a similar view showing it applied with the base in a vertical plane.

Fig. 3 is a vertical section of the trap as placed in the upright position.

In these drawings 2 represents the jaw members which are pivotally connected to the upwardly turned ends 3 of a base member 4, which is of horseshoe shape following generally the conformation of one of the jaw members 2, when spread. The ends of the spring 5, as is usual in such traps, are apertured at 6 to pass freely on to one of the upwardly turned ends of the base member and exert its resilience on the ends of the jaw members 2 adjacent their pivotal connection to the upwardly turned end 3 of the base member 4.

The pivot of the loose jaw member 2, that is, the one that is not retainable by the latch 8, is produced and outwardly bent as at 13 beneath the loop of the spring 5 for a reason to be explained later.

Midway between the upwardly turned ends 3 of the base member 4 a portion 7 is upturned from its outer edge, to which upwardly turned portion is hinged the pawl or latch 8, which extends across the adjacent jaw member 2 to a position where it may be engaged and retained by a sear 9 or 10 of the bait pan 11, which sear and bait pan are pivotally mounted at 12 to portions upwardly turned from the inner edge of the base 4, opposite 7. The bait pan 11, as is usual, is circular in plan and its sear 9, 10 is secured to it to be movable with it.

In use, the end of the latch 8 may be applied over one of the jaw members 2 to engage the sear notch 9 and support the bait pan 11 in a plane approximately parallel to the base 4, as when the trap is disposed horizontally on the ground, in which case the space below the pan is left clear of obstruction that the pan may move freely downward and is not liable to be packed with snow between the underside of the pan and the bait, as in an ordinary trap. Or the end of the latch 8 may engage the sear notch 10, as shown in Fig. 2, in which case the trap may be hung or projected in a vertical plane, while the pan 11 is in a horizontal plane.

When in this position, the outwardly bent end 13 of the loose jaw 2 retains that jaw in the open position and prevents it falling over on the other jaw member, as without some such retaining means it would tend to do.

The trap may thus be placed across a hole to which the animal may desire to pass, and while trying to do so, it will tread on the pan 11 and will release the jaws. The jaws 2 will in this application close on the animal's head or across its body, according to the direction in which it passes through the trap, and be instantly killed, instead of being caught by a foot or by the leg, as is usual. When caught by the foot or leg, unless the traps are examined at short intervals, the animal frequently escapes or dies a lingering death.

Having now particularly described our invention, we hereby declare that what we claim as new and desire to be protected in by Letters Patent, is:

1. An animal trap, comprising in combination, a base portion having an open centre, opposed jaw members pivotally connected to the base member across its open centre, a spring the ends of which are apertured to pass over one end of each of the jaw members adjacent their pivots to effect closure of the jaw members on one another, a bait pan pivotally connected to the inner edge of the base to project over its open centre, said bait pan having a double notched sear adjacent its pivot, a releasable latch loosely connected to the base opposite the sear of the bait pan and adapted to latch across one of the jaw members and retain it in the open position, and means independent of the sear and latch for holding the other jaw member in the open position.

2. An animal trap, comprising in combination, a base portion having an open centre, opposed jaw members pivotally connected to the base member across its open centre, a spring the ends of which are apertured to pass over one end of each of the jaw members adjacent their pivots to effect closure of the jaw members on one another, a bait pan pivotally connected to the inner edge of the base to project over its open centre, said bait pan having a double notched sear adjacent its pivot, a releasable latch loosely connected to the base opposite the sear of the bait pan and adapted to latch across one of the jaw members and retain it in the open position, and means cooperative with one end of the spring and independent of the sear and latch for holding the other jaw member in the open position.

3. An animal trap, comprising in combination, a base portion having an open centre, opposed jaw members pivotally connected to the base across its open centre, a spring the ends of which are apertured to pass over one end of each jaw member adjacent its pivot and effect closure of the jaw members on one another, a bait pan pivotally connected to the base to project over its open centre, and means cooperative with the bait pan for retaining one of the jaw members in the open position with the plane of the pan either parallel or at right angles to that of the base, and means operative with the spring end for retaining the other jaw member in the open position.

4. An animal trap, comprising in combination, a flat base portion of horseshoe form having portions upturned adjacent the ends and apertured to receive the pivots of the jaw members, a spring the ends of which are apertured to pass over one of the upturned ends of the base member between the base and the pivot apertures of the jaw members, opposed jaw members pivotally mounted in the apertures of the upturned ends, one end of one jaw member pivot being bent round to pass under one end of the spring, a bait pan pivotally connected to the base to project over the space between the ends of the base member, said base member having a double notched sear connected to it, and a latch member pivotally connected to the base opposite the bait pan connection and adapted to engage one or other of the notches of the sear and retain that jaw member in the open position with the plane of the pan parallel to that of the base or at right angles thereto.

In testimony whereof we affix our signatures.

ROBERT HEDDLE.
ROBERT QUA.